US009021591B2

(12) United States Patent
Serber

(10) Patent No.: US 9,021,591 B2
(45) Date of Patent: Apr. 28, 2015

(54) DISTRIBUTED NETWORK PROTECTION

(75) Inventor: Pablo Daniel Serber, London (GB)

(73) Assignee: International Business Machines Corporation, Armonk, NY (US)

( * ) Notice: Subject to any disclaimer, the term of this patent is extended or adjusted under 35 U.S.C. 154(b) by 1499 days.

(21) Appl. No.: 12/159,218

(22) PCT Filed: Nov. 6, 2006

(86) PCT No.: PCT/EP2006/068146
§ 371 (c)(1),
(2), (4) Date: Jun. 26, 2008

(87) PCT Pub. No.: WO2007/073971
PCT Pub. Date: Jul. 5, 2007

(65) Prior Publication Data
US 2009/0138968 A1    May 28, 2009

(30) Foreign Application Priority Data
Dec. 28, 2005   (CA) ...................................... 2532699

(51) Int. Cl.
*G06F 21/00* (2013.01)
*H04L 29/06* (2006.01)

(52) U.S. Cl.
CPC ............ *H04L 63/14* (2013.01); *H04L 63/1416* (2013.01); *H04L 63/1425* (2013.01); *H04L 63/16* (2013.01)

(58) Field of Classification Search
None
See application file for complete search history.

(56) References Cited

U.S. PATENT DOCUMENTS

| 6,279,113 B1* | 8/2001 | Vaidya ............................ 726/23 |
| 2003/0051026 A1 | 3/2003 | Carter et al. |
| 2003/0154399 A1* | 8/2003 | Zuk et al. ...................... 713/201 |
| 2005/0005017 A1 | 1/2005 | Ptacek et al. |
| 2006/0129382 A1* | 6/2006 | Anand et al. ...................... 704/9 |

FOREIGN PATENT DOCUMENTS

WO    WO02101516 A2    12/2002

OTHER PUBLICATIONS

Balasubramaniyan et al.; An Architecture for Intrusion Detection using Autonomous Agents; Computer Security Applications Conference, 1998. Proceedings. 14th Annual Phoenix, AZ, USA Dec. 7-11, 1998, Los Alamitos, CA, USA, IEEE Comp. Soc, US, Dec. 7, 1998; pp. 13-14; XP010318614.
Patent application for U.S. Appl. No. 14/607,189, filed Jan. 28, 2015.

* cited by examiner

*Primary Examiner* — Michael S McNally
*Assistant Examiner* — Carlton Johnson
(74) *Attorney, Agent, or Firm* — Schmeiser, Olsen & Watts, LLP; John Pivnichny

(57) ABSTRACT

A method for processing frames transmitted in a network including nodes and network segments connecting the nodes. Frames transmitted over network segments are detected. Frame information from each detected frame is stored in a frame information repository. A stored hierarchical data structure includes vectors specifying frame information defining frames permitted in the network, classes including vectors with constraints on the vectors, and patterns including classes with constraints on the classes. The frame information in the detected frames may not match the frame information specified in the vectors. The vectors, if matched by the frame information in the detected frames, may not satisfy the constraints in the classes. The vectors, if matched by the frame information in the detected frames, may satisfy the constraints in the classes, and the classes whose constraints are satisfied by the matched vectors may not satisfy the constraints in the patterns.

21 Claims, 8 Drawing Sheets

DISTRIBUTED NETWORK PROTECTION

BACKGROUND

Communication networks are targets to different threats such as intrusion, viruses, trojan horses, worms, spyware, adware, denial of service attacks, distributed denial of service attacks, teardrops attacks, TCP SYN (transmission control protocol synchronization) attacks, one on one attacks, dictionary attacks, unauthorized access, unauthorized usage of VoIP (voice over Internet protocol) systems and VoIP eavesdropping. Threats to a network may originate from both outside the network and inside the network.

Commonly used measures against such threats include perimeter firewalls, personal application firewalls (PAF), internal security gateways (ISG), host-based security software and anti-virus software.

SUMMARY

Network traffic is analyzed in a hierarchical framework to learn and identify normal behavior of the network, and to identify deviations from the normal behavior. Deviations that are undesired are blocked.

A system for protecting a network comprises sniffer modules and a processing module. The sniffer modules are implemented in nodes of the network to sniff traffic on segments of the network that are coupled to the nodes. The processing module collects and analyzes the traffic in a hierarchical framework to learn and identify normal behavior of the network, and to identify deviations from the normal behavior.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
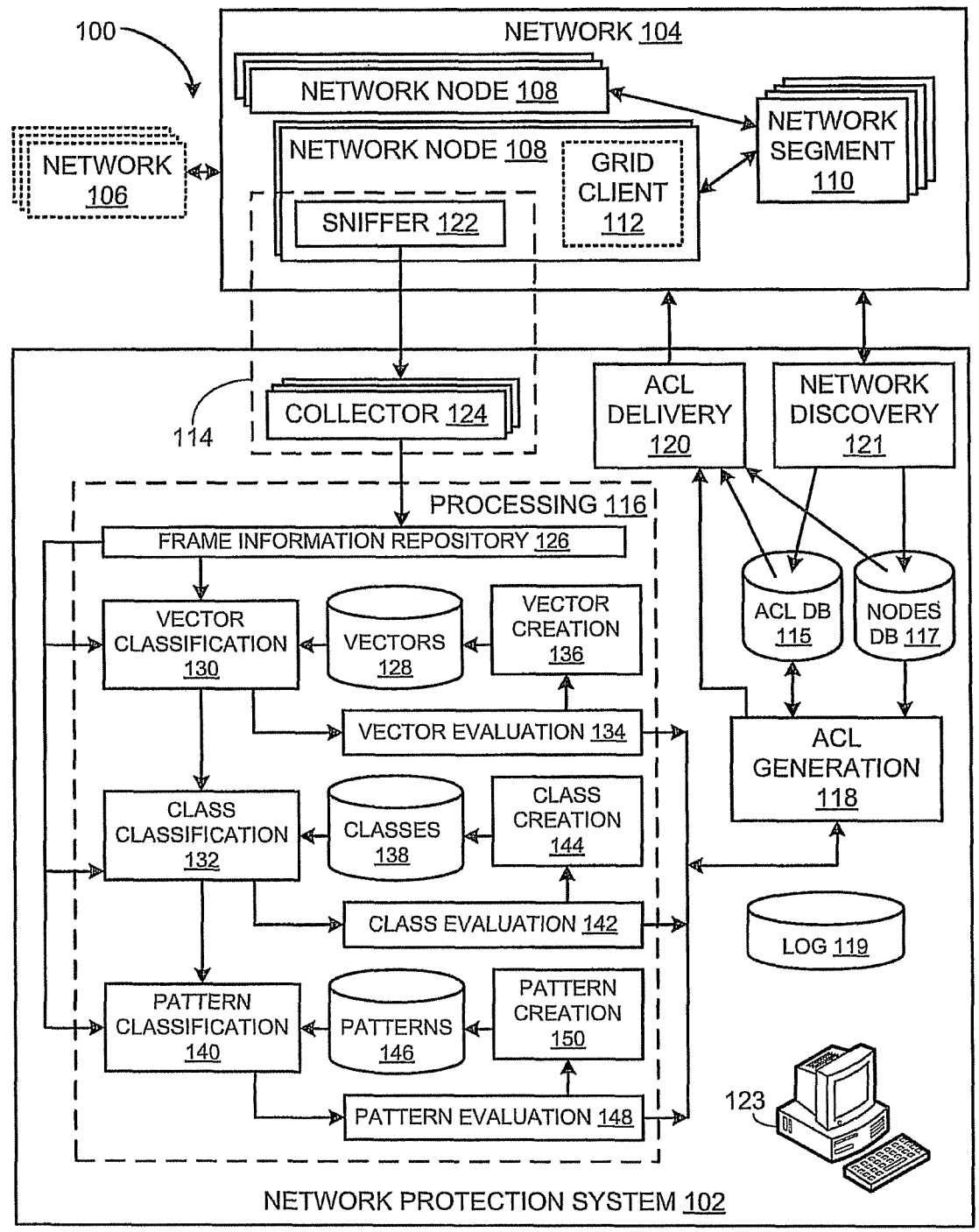
FIG. 1 is a block diagram of the architecture of an exemplary system that comprises a Network Protection System (NPS), a network and an optional one or more other networks, according to embodiments of the invention.

FIG. 1 is a block diagram of the architecture of an exemplary system 100 comprises a Network Protection System (NPS) 102, a network 104 and an optional one or more networks 106, according to embodiments of the invention. Network 104 includes network nodes 108 and network segments 110. Each segment 110 connects nodes 108 to one another or, if applicable, connects one or more of nodes 108 to any of networks 106. Segments 110 may include any combination of optical, wired and wireless communication media.

Network 104 may include any combination of LAN (local area networks), WLAN (wireless LAN), mesh WLAN, WAN (wide area networks), VLAN (virtual LAN), enterprise networks, metropolitan networks, and any other suitable networks.

A non-exhaustive list of examples for nodes 108 includes network appliances, routers, switches, hubs, wireless access points, mesh points, network sensors, servers, mainframe computers, work stations, desktop computers, notebook computers, laptop computers, pocket computers, personal digital assistants (PDA), cellular phones, smart phones, Internet protocol (IP) phones, firewall appliances, network printers, load balancing appliances, and any other suitable network node. Optionally, any of nodes 108 may have Grid functionality (for example, through a Grid client 112), that complies with the Open Grid Services Architecture (OGSA) and/or with the Open Grid Services Infrastructure (OGSI).

Any of nodes 108 may be "802.11-enabled", which means that wireless communications therebetween are in accordance with one or more of the following standards defined by the IEEE (Institute of Electrical and Electronics Engineers) for LAN Medium Access Control (MAC) and Physical layer (PHY) specifications.

| Standard | Published | Maximum Speed | Frequency |
|---|---|---|---|
| 802.11 | 1997 | 2 Mbps | 2.4 GHz |
| 802.11a | 1999 | 54 Mbps | 5.0 GHz |
| 802.11b | 1999 | 11 Mbps | 2.4 GHz |
| 802.11g | 2003 | 54 Mbps | 2.4 GHz |
| 802.11e draft amendment D7 | January 2004 | | |

However, it will be obvious to those of ordinary skill in the art how to modify the following for other existing WLAN standards or future related standards, including 802.11n and 802.11s. The 802.11e draft amendment D7 "MAC Enhancements for Quality of Service (QoS)" is based on IEEE standard 802.11, 1999 (Reaffirm 2003), IEEE standard 802.11g, 2003 and IEEE standard 802.11h, 2003.

Figure 2:
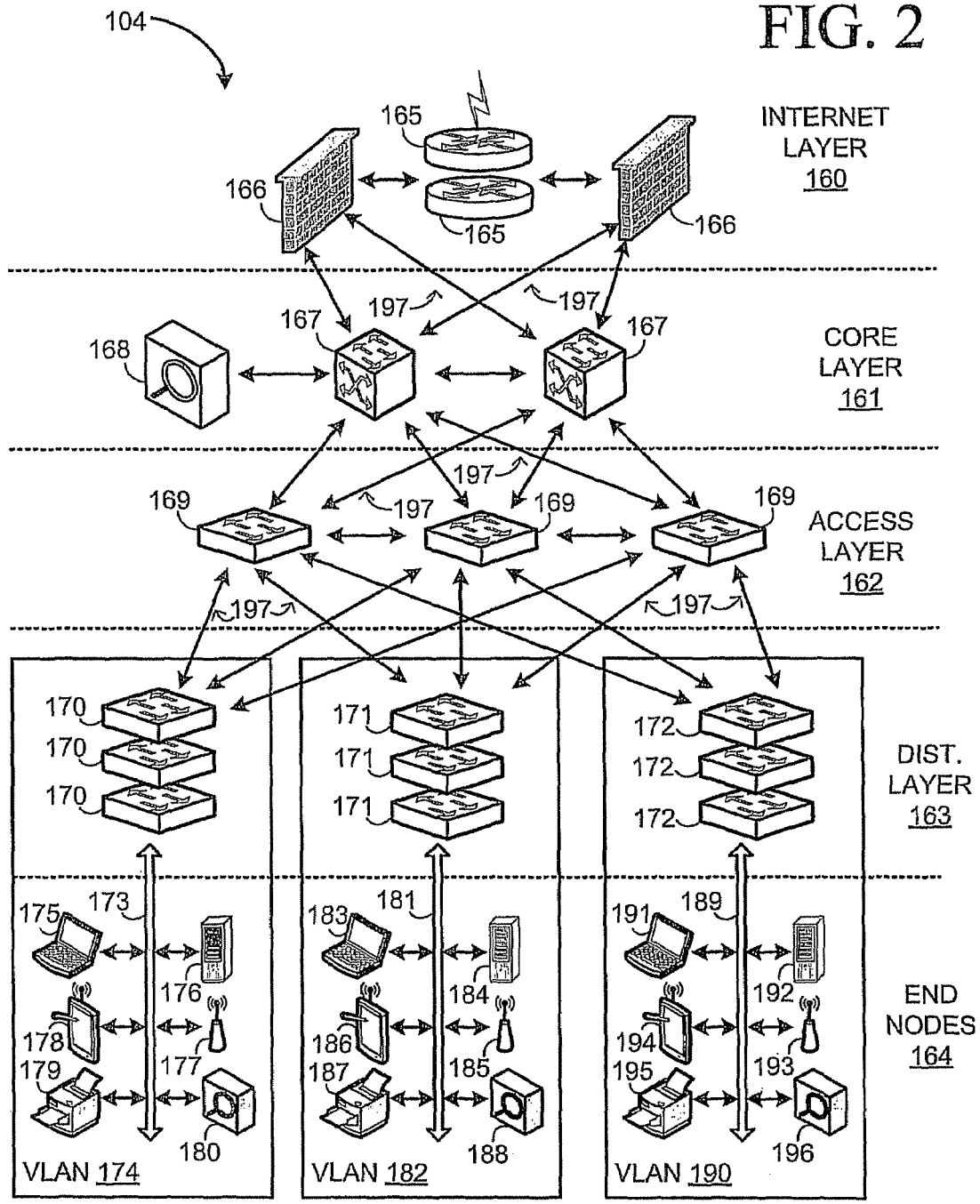
FIG. 2 is a schematic diagram of the exemplary network presented in FIG. 1, according to embodiments of the invention.

FIG. 2 is a schematic diagram of exemplary network 104, according to embodiments of the invention. Network 104 is logically divided into an Internet layer 160, a core layer 161, an access layer 162, a distribution layer 163 and end nodes 164. Internet layer 160 includes two Internet layer routers 165 that connect network 104 to any of networks 106 and/or to the Internet. Internet layer 160 includes in addition two perimeter firewalls 166.

Core layer 161 includes two layer-3 switches 167 and a network probe 168. Access layer 162 includes three layer-2 switches 169. Distribution layer 163 includes three layer-2 user access switches 170, three layer-2 user access switches 171 and three layer-2 user access switches 172. Layer-2 user access switches are also known as desktop switches.

Switches 170 and Ethernet segments 173 are part of a VLAN 174. VLAN 174 includes end nodes, for example, any or combination of: computers 175, servers 176, wireless access points 177, wireless devices 178, printers 179 and network probes 180. Any of computers 175 and servers 176 may include a Grid client.

Switches 171 and Ethernet segments 181 are part of a VLAN 182. VLAN 182 includes end nodes, for example, any or combination of: computers 183, servers 184, wireless access points 185, wireless devices 186, printers 187 and network probes 188. Any of computers 183 and servers 184 may include a Grid client.

Switches 172 and Ethernet segments 189 are part of a VLAN 190. VLAN 190 includes end nodes, for example, any or combination of: computers 191, servers 192, wireless access points 193, wireless devices 194, printers 195 and network probes 196. Any of computers 191 and servers 192 may include a Grid client.

Arrows 197 and Ethernet segments 173, 181 and 189 represent some examples of segments 110.

Returning to FIG. 1, NPS 102 includes an acquisition module 114, a processing module 116, an access list (ACL) generation module 118, an ACL rule delivery module 120, a network discovery module 121, an ACL rules database 115, a nodes database 117, a log 119 and an administration interface (I/F) 123. Implementation of NPS 102 may be distributed among any combination of nodes 108 and/or nodes of any of networks 106. NPS 102 may be implemented within a computer system in hardware, software, firmware or any suitable combination thereof. The databases and the software (including the modules) of the NPS 102 may be stored on a computer readable hardware storage medium or on computer readable hardware storage media of the computer system. The computer system comprises a processor on which the software (including the modules) of the NPS 102 is configured to be executed.

Network discovery module 121 may scan network 104 periodically to detect nodes 108 and to collect information about the configuration of nodes 108. A non-exhaustive list of examples for methods that network discovery module 121 may use includes SNMP (simple network management protocol) polling according to RFC (Request for Comments) 1157, reception of SNMP traps according to RFC 1157 and/or RFC 1215, echo requests and replies according to RFC 792, TFTP (trivial file transfer protocol) according to RFC 1350 and RFC 983, and any other suitable method.

Network discovery module 121 may store information about detected nodes 108 in nodes database 117. With the periodic scanning, network discovery module 121 may verify whether the information in nodes database 117 is up to date and may otherwise update it. A system administrator may manually make changes to nodes database 117 by way of administration I/F 123.

Figure 3:
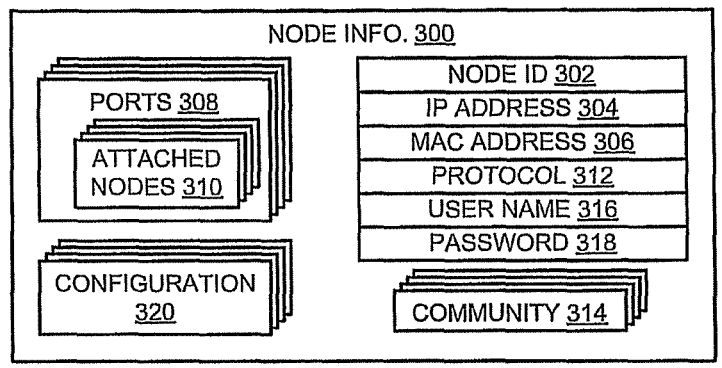
FIG. 3 is a diagram of an exemplary data structure of node's information in a database of a Network Protection System, according to embodiments of the invention.

FIG. 3 is a diagram of an exemplary data structure 300 of the information in nodes database 117 about a specific node, according to embodiments of the invention. Data structure 300 includes the following fields:

a network identification name 302 that may be assigned to the specific node by network discovery module 121 (e.g. switch A, Switch B, Router X);

an IP address 304 assigned to the specific node;

a MAC address 306 of the specific node;

a list 308 of ports of the specific node;

lists 310 of MAC addresses of nodes that are attached to the ports;

one or more communication protocols 312 used by the specific node;

a list 314 of one or more SNMP communities according to RFC 1157; a user name 316 required for configuring the specific node;

a password 318 required for configuring the specific node; and a list 320 of configuration parameters of the specific node.

Fields presented in FIG. 3 may be optional, and other fields may be added if needed. ACL rules database 115 may store rules for blocking and/or isolating communication traffic that is undesired, for example, traffic that is considered to be a threat. ACL generation module 118 may generate the rules stored in ACL rules database 115, and a system administrator may alter the content of ACL rules database 115 through administration I/F 123 if needed.

Figure 4:
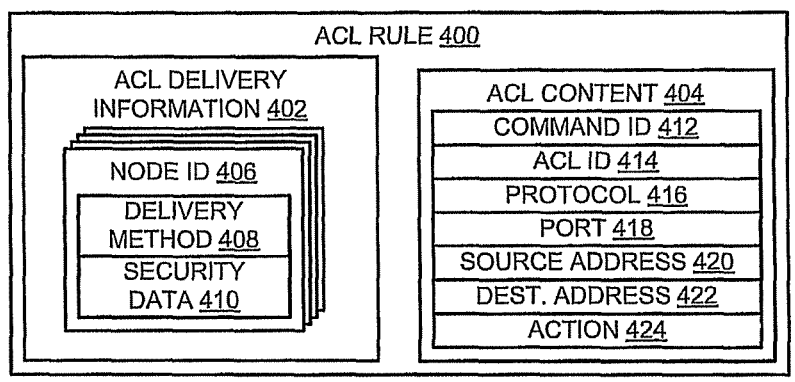
FIG. 4 is a diagram of an exemplary data structure of an ACL (access list) rule in a database of a Network Protection System, according to embodiments of the invention.

FIG. 4 is a diagram of an exemplary data structure 400 of an ACL rule stored in ACL rules database 115, according to embodiments of the invention. Data structure 400 includes ACL delivery information 402 and an ACL content 404. ACL rules database 115 may receive ACL delivery information 402 from network discovery module 121, and ACL delivery module 120 may use ACL delivery information 402 to apply rules from ACL rules database 115 to nodes 108.

ACL delivery information 402 includes a list 406 of one or more node IDs 302 to which the rule should be applied. For any of the nodes, ACL delivery information 402 may include a delivery method 408 and security data 410. The delivery method may differ between nodes of different types and/or different manufacturers. Security data 410 may include, for example, community 314, user name 316 and password 318 of a node.

ACL content 404 includes an identification name 412 of a command to be applied and an identification 414 of an ACL rule to apply. A command may be specific to the type of equipment and/or to the manufacturer of the equipment addressed in node ID 406. ACL rule identification 414 may be generated by ACL rules database 115.

ACL content 404 also includes an identification 416 of a protocol to which the rule applies, e.g. TCP or UDP (user datagram protocol), an identification 418 of a TCP/UDP port to which the rule applies, a source address 420 and a destination address 422 of communication frames to which the rule applies, and an action 424 to be applied to that communication (e.g. deny or permit).

According to embodiments of the invention, ACL delivery module 120 may apply rules to nodes in any layer of network 104, e.g. Internet layer 160, core layer 161, access layer 162, distribution layer 163 and end nodes 164. For example, ACL delivery module 120 may apply rules to any of layer-2 user access switches 170, 171 and 172 of distribution layer 163.

Figure 5:
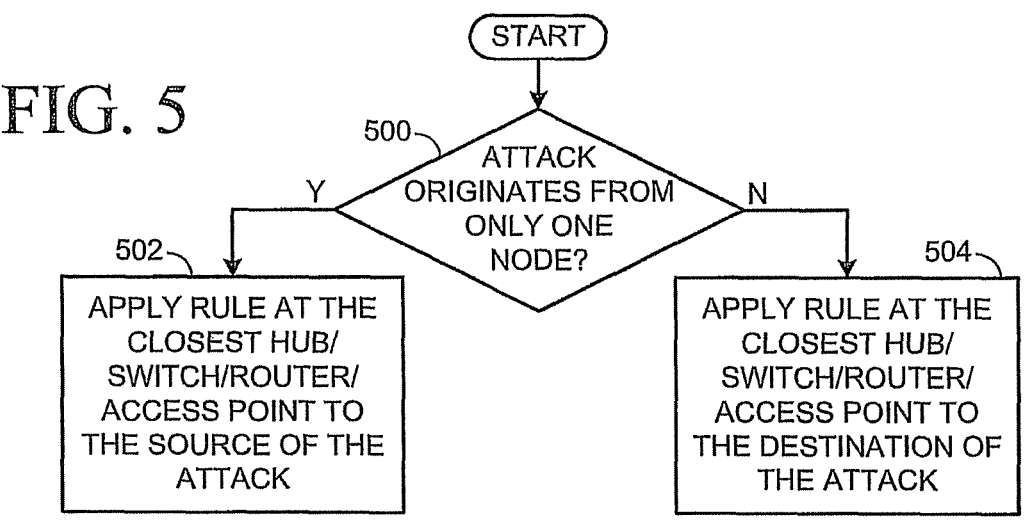
FIG. 5 is a flowchart of an exemplary method in a network protection system to apply ACL rules to a network, according to embodiments of the invention.

Reference is now made to FIG. 5, which is a flowchart of an exemplary method in NPS 102 to apply ACL rules to network 104. The method begins if NPS 102 recognizes that undesired frames of an attack are transmitted over one or more of segments 110. At 500, NPS 102 identifies the number of sources for the undesired frames.

The only source for undesired frames of the attack may be a particular one of nodes 108. In that case, as shown at 502, ACL delivery layer 120 configures the nearest possible node 108 to the source of the frames to block the frames. For example, NPS 102 may recognize that a particular one of computers 175 sources undesired frames of an attack and that the frames' destinations are servers 176, 184 and 192. ACL delivery module 120 may configure one of layer-2 user access switches 170 that is the closest to the source of the frames to block the frames.

In another case, there may be two or more sources for undesired frames of the attack. As shown at 504, ACL delivery module 120 configures the nearest possible node 108 to the destination of the frames to block the frames. For example, NPS 102 may recognize that the sources of undesired frames of an attack are computers 175, 183 and 191 and external sources through routers 165, and that the destination of the frames is a particular one of servers 192. ACL delivery layer 120 may configure one of layer-2 user access switches 172 that is the closest to the destination of the frames to block the frames.

Returning to FIG. 1, acquisition module 114 includes communication sniffer modules 122 and one or more information collector modules 124. Sniffer modules 122 may be implemented in some of nodes 108 where possible and appropriate, for example, in any of computers 175, 183 and 191 and servers 176, 184 and 192 that has a Grid client, in any of firewalls 166, and in any of network probes 180, 188 and 196, and may sample communication frames over any of segments 110 to which they are coupled. In nodes with Grid clients, part of the node's idle central processing unit (CPU) capabilities will be donated to sniff, organize and send the data to the information collector modules 124.

Figure 6:
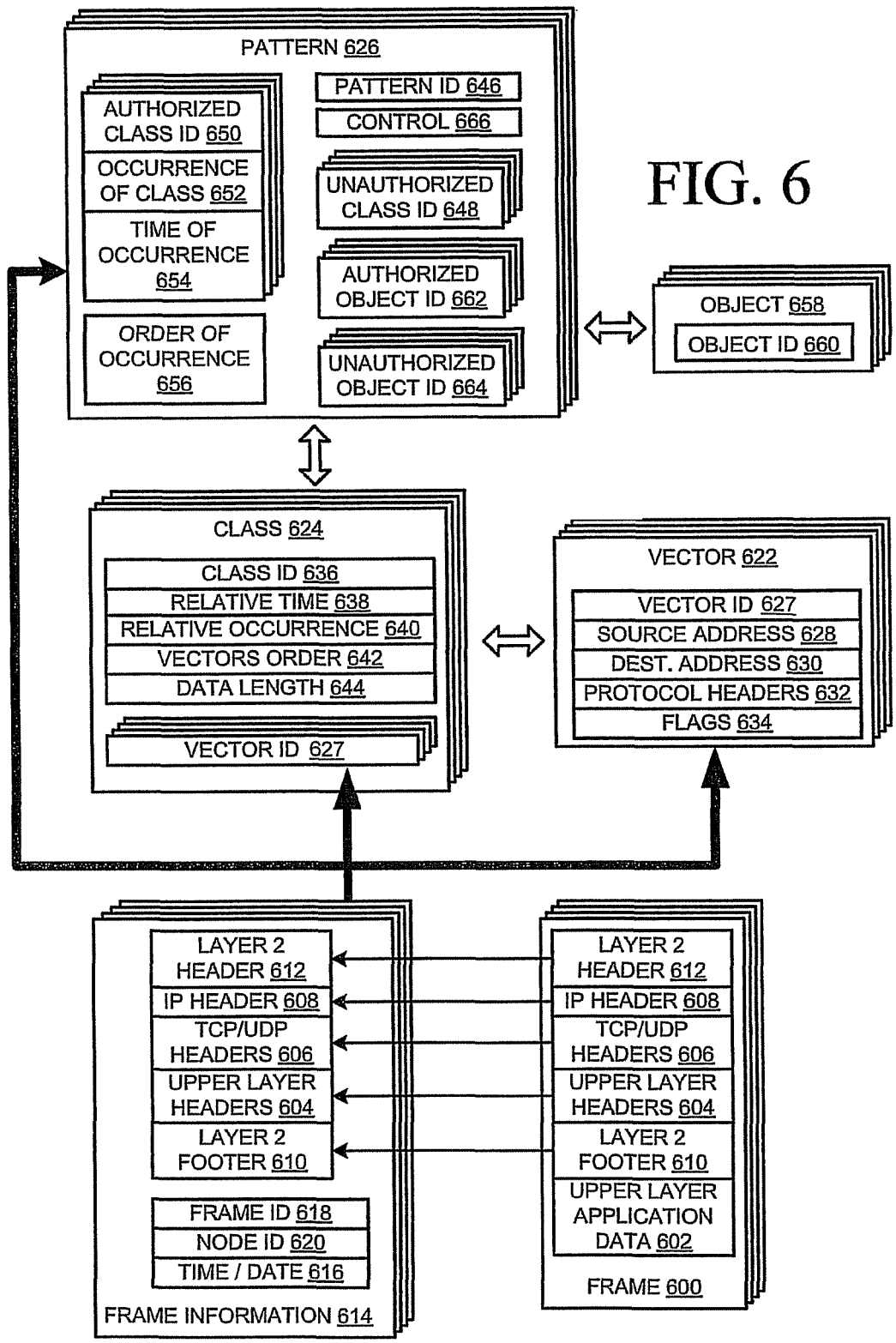
FIG. 6 is a diagram of exemplary data structures occurring or generated in the system of FIG. 1, according to embodiments of the invention.
Figure 7:
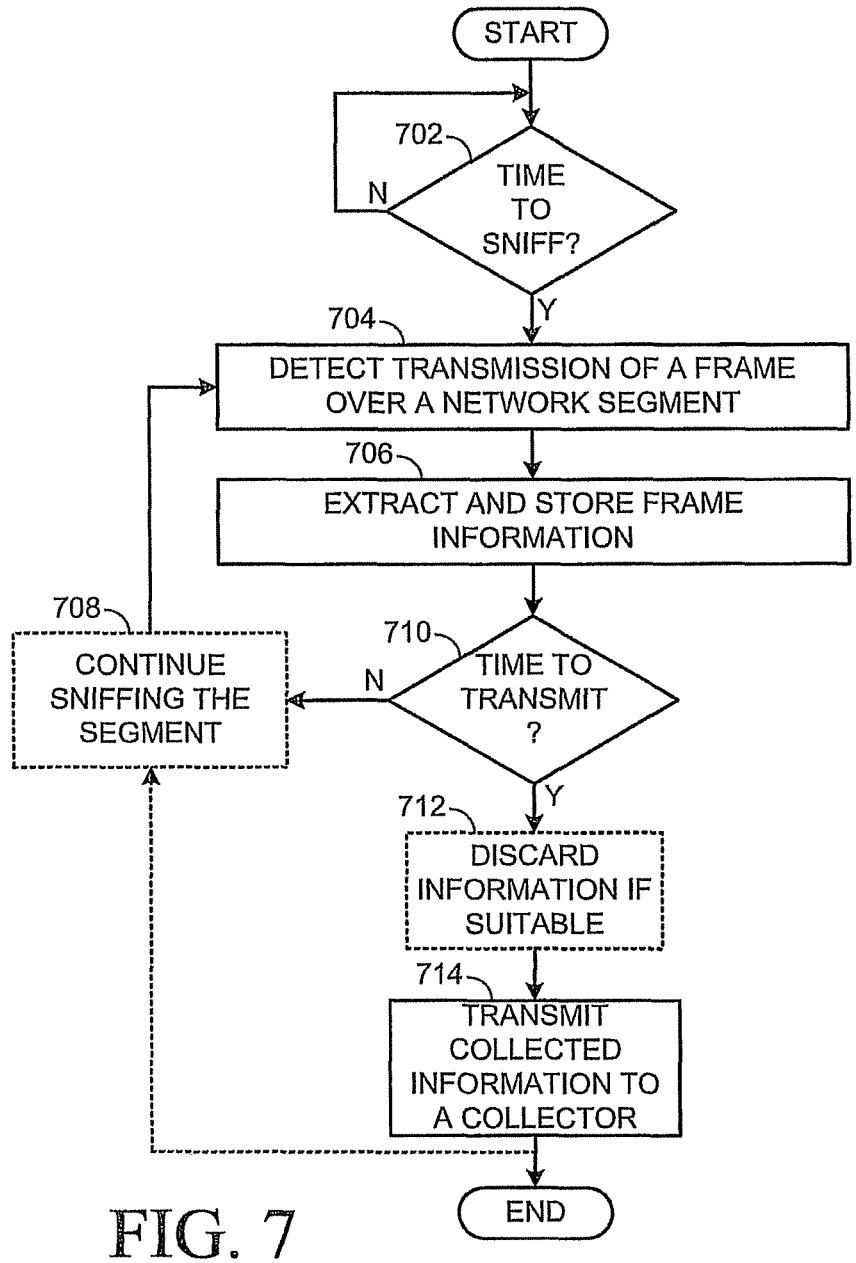
FIG. 7 is a flowchart of an exemplary method in a sniffer module, according to embodiments of the invention.

Reference is now made in addition to FIG. 6 and FIG. 7. FIG. 6 is a diagram of exemplary data structures occurring or generated in system 100, according to embodiments of the invention. FIG. 7 is a flowchart of an exemplary method in any one of sniffer modules 120, according to embodiments of the invention.

Nodes 108 may communicate frames 600 over segments 110 according to one or more predefined protocols. Any of nodes 108 may be a source of a frame, a destination for a frame, or may be part of a route between the source and a destination of a frame.

A non-exhaustive list of examples for protocols with which nodes 108 may communicate includes TCP as described in RFC 793 by DARPA (Defense Advanced Research Projects Agency) in September 1981, UDP as described in RFC 768 by DARPA in January 1980, IP as described in RFC 791 by DARPA in September 1981, IEEE standard 802.3 published in 1985, successors of the above RFC and standards, and any other suitable protocol.

A frame 600 may include, for example, upper layer application data 602, upper layer headers 604, TCP/UDP layer headers 606, an IP layer header 608, a layer-2 footer 510 and a layer-2 header 612. Header 612 and footer 610 may include Ethernet-related information, checksum and/or CRC (cyclic redundancy check) of frame 600.

As shown in 702, a particular sniffer module 122 may start a sniffing interval in which it sniffs a particular one of network segments 110, for example, according to a predefined schedule, according to availability of resources of the node 108 hosting the sniffer module, or according to any other suitable parameter. In another example, a particular sniffer module 122 may continuously sniff a particular one of network segments 110.

At 704, the particular sniffer module may detect the transmission of a frame 600 over the particular network segment, and at 706, the sniffer module may extract and store frame information 614 of the detected frame 600. Frame information 614 may include, for example, upper layer headers 604, TCP/UDP layer headers 606, IP layer header 608, layer-2 footer 610, layer-2 header 612 and an indication 616 of time and date at which the frame 600 was detected. The sniffer module may add to frame information 614 a frame identification tag 618 and a node identification tag 620 of the node 108 that hosts the sniffer module.

Until the sniffing interval ends at 710, the particular sniffer module may continue to sniff at 708 the particular network segment and to collect frame information 614 of detected frames 600. If suitable, at 712, the particular sniffer module may discard any of the collected frame information 614. For example, the exemplary sniffer module may discard information of detected frames or datagrams that belong to other communication protocols, such as IPX (internetwork packet exchange) and SNA (systems network architecture).

In another example, the particular sniffer module may discard information 614 of detected frames if the detected frames were received by the particular sniffer module from an intermediary node (e.g. a switch of a hub) and not from the source. At 714, the particular sniffer module may transmit the collected frames information 614 to one or more of collector modules 124. The method may terminate or may continue to 708.

List 1 shows the simplified content of headers and footers of exemplary frames identified by the numbers 7, 8, 9, 10, 11, 12, 13 and 15:

List 1:
Frame 7 (62 bytes on wire, 62 bytes captured)
Ethernet II, Src: 10.10.1.100 (00:01:ab:01:ab:1f), Dst: 10.10.1.151 (00:01:ab:09:e4:03)
Internet Protocol, Src: 10.10.1.100 (10.10.1.100), Dst: 10.10.1.151 (10.10.1.151)
Transmission Control Protocol, Src Port: 1623 (1623), Dst Port: 21(21), Seq: 0, Ack: 0, Len: 0
Frame 8 (62 bytes on wire, 62 bytes captured)
Ethernet II, Src: 10.10.1.100 (00:01:ab:01:ab:1f), Dst: 10.10.1.151 (00:01:ab:09:e4:03)
Internet Protocol, Src: 10.10.1.100 (10.10.1.100), Dst: 10.10.1.151 (10.10.1.151)
Transmission Control Protocol, Src Port: 1623 (1623), Dst Port: 21 (21), Seq: 0, Ack: 0, Len: 0
Frame 9 (62 bytes on wire, 62 bytes captured)
Ethernet II, Src: 10.10.1.151 (00:01:ab:09:e4:03), Dst: 10.10.1.100 (00:01:ab:01:ab:1f)
Internet Protocol, Src: 10.10.1.151 (10.10.1.151), Dst: 10.10.1.100 (10.10.1.100)
Transmission Control Protocol, Src Port: 21 (21), Dst Port: 1623 (1623), Seq: 0, Ack: 1, Len: 0
Frame 10 (54 bytes on wire, 54 bytes captured)
Ethernet II, Src: 10.10.1.100 (00:01:ab:01:ab:1f), Dst: 10.10.1.151 (00:01:ab:09:e4:03)
Internet Protocol, Src: 10.10.1.100 (10.10.1.100), Dst: 10.10.1.151 (10.10.1.151)
Transmission Control Protocol, Src Port: 1623 (1623), Dst Port: 21 (21), Seq: 1, Ack: 1, Len: 0
Frame 11(54 bytes on wire, 54 bytes captured)
Ethernet II, Src: 10.10.1.100 (00:01:ab:01:ab:1f), Dst: 10.10.1.151 (00:01:ab:09:e4:03)
Internet Protocol, Src: 10.10.1.100 (10.10.1.100), Dst: 10.10.1.151 (10.10.1.151)
Transmission Control Protocol, Src Port: 1623 (1623), Dst Port: 21 (21), Seq: 1, Ack: 1, Len: 0

Frame 12 (74 bytes on wire, 74 bytes captured)
Ethernet II, Src: 10.10.1.151 (00:01:ab:09:e4:03), Dst: 10.10.1.100 (00:01:ab:01:ab:1f)
Internet Protocol, Src: 10.10.1.151 (10.10.1.151), Dst: 10.10.1.100 (10.10.1.100)
Transmission Control Protocol, Src Port: 21 (21), Dst Port: 1623 (1623), Seq: 1, Ack: 1, Len: 20
File Transfer Protocol (FTP)
Frame 13 (54 bytes on wire, 54 bytes captured)
Ethernet II, Src: 10.10.1.100 (00:01:ab:01:ab:1f), Dst: 10.10.1.151 (00:01:ab:09:e4:03)
Internet Protocol, Src: 10.10.1.100 (10.10.1.100), Dst: 10.10.1.151 (10.10.1.151)
Transmission Control Protocol, Src Port: 1623 (1623), Dst Port: 21 (21), Seq: 1, Ack: 21, Len: 0
Frame 15 (60 bytes on wire, 60 bytes captured)
Ethernet II, Src: 10.10.1.1 (00:01:ab:c1:af:01), Dst: Broadcast (ff:ff:ff:ff:ff:ff)
Address Resolution Protocol (Request)

Information included in the headers and footer a frames 7, 8, 9, 10, 11, 12, 13 and 15 may actually be more detailed than presented in List 1 and may contain more protocol-related and time-related information and flags, as presented in List 2 for frame 9:

List 2
Frame 9 (62 bytes on wire, 62 bytes captured)
    Arrival Time Dec. 4, 2005 18:50:40.155934000
    Time delta from previous packet: 0.000173000 seconds
    Time since reference or first frame: 4.015422000 seconds
    Frame Number: 9
    Packet Length: 62 bytes
    Capture Length: 62 bytes
    Protocols in frame: eth:ip:tcp
Ethernet II, Src: 10.10.1.151 (00:01:ab:09:e4:03), Dst: Dst: 10.10.1.100 (00:01:ab:01:ab:1f)
    Destination: Dst: 10.10.1.100 (00:01:ab:01:ab:1f)
    Source: 10.10.1.151 (00:01:ab:09:e4:03)
    Type: IP (0x0800)
Internet Protocol, Src: 10.10.1.151 (10.10.1.151), Dst: 10.10.1.100 (192.168.0.13)
    Version: 4
    Header length: 20 bytes
Differentiated Services Field: 0x00 (DSCP 0x00: Default; ECN: 0x00)
    0000 00..=Differentiated Services Codepoint: Default (0x00)
    ......0.=ECN-Capable Transport (ECT): 0
    .......0=ECN-CE: 0
Total Length: 48
Identification: 0x0000 (0)
Flags: 0x04 (Don't Fragment)
    0...=Reserved bit: Not set
    .1..=Don't fragment: Set
    ..0.=More fragments: Not set
Fragment offset: 0
Time to live: 64
Protocol: TCP (0x06)
Header checksum: 0xb968 [correct]
    Good: True
    Bad: False
Source: 10.10.1.151 (10.10.1.151)
Destination: 10.10.1.100 (10.10.1.100)
Transmission Control Protocol, Src Port: 21 (21), Dst Port: 1623 (1623), Seq: 0, Ack: 1, Len: 0
Source port: 21 (21)
Destination port: 1623 (1623)
Sequence number: 0 (relative sequence number)
Acknowledgement number: 1 (relative ack number)
Header length: 28 bytes
Flags: 0x0012 (SYN, ACK)
    0.......=Congestion Window Reduced (CWR): Not set
    .0......=ECN-Echo: Not set
    ..0.....=Urgent: Not set
    ...1....=Acknowledgment: Set
    ....0...=Push: Not set
    .....0..=Reset: Not set
    ......1.=Syn: Set
    .......0=Fin: Not set
Window size: 5840
Checksum: 0x079a [correct]
Options: (8 bytes)
    Maximum segment size: 1460 bytes
    NOP
    NOP
    SACK permitted
SEQ/ACK analysis
    This is an ACK to the segment in frame: 8
    The RTT to ACK the segment was: 0.000173000 seconds Collector modules 124 receive frame information 614 from sniffer modules 122 and forward frame information 614 to a frame information repository 126 of processing module 116. Processing module 116 evaluates newly received information in frame information repository 126. If processing module 116 determines that any of the received frame information 614 represents a potential threat to network 104 or to any of networks 106, processing module 116 may inform ACL generation module 118 about the potential threat. In addition, processing module 116 may update databases of processing module 116 with respect to the received frame information 614.

Processing module 116 may analyze traffic in network 104 in a hierarchical framework. For example, processing module 116 may use three hierarchical data types shown in FIG. 6—vectors 622, classes 624 and patterns 626. A vector represents the control information of one or more frames, without the payload (data) of the one or more frames. A class represents a sequence of vectors, and constraints on the sequence of vectors. A pattern represents a sequence of classes, and constraints on the sequence of classes.

Vectors 622 are created from frame information 614 and may include, for example, a vector identification tag 626, a source address field 628, a destination address field 630, a protocol headers field 632 and a protocol flags field 534.

A vector may identify one detected frame 600. For example, a TCP SYN (Synchronize) frame may be transmitted from a port 3302 of a node 108 having an IP address 10.10.1.100 to a port 8080 of a node 108 having an IP address 10.10.1.150. A simplified respective vector for this example with tag 627 "TCPSYN_1" is shown in Line (1):

(1)  TCPSYN_1=<10.10.1.100,10.10.1.151,3302,8080, TCP,SYN, protocol Flags >

In another example, a vector may represent the transmission of a TCP SYN frame from any source and any port to port 8080 of the node 108 having IP address 10.10.1.150. A simplified respective vector for this example with tag 627 "TCPSYN_ALL" is shown in Line (2):

(2)  TCPSYN_ALL=<*,10.10.1.151,*,8080,TCP,SYN, protocol Flags>

The wildcard symbol "*" may be used in vectors 622 in different ways. For example, "10.10.1.*" may represent all IP addresses starting with "10.10.1.". In another example, indication of a port with "80*" may represent all port numbers starting with "80". In a yet another example, a flag indicated by "0x0*" may represent all flags starting with "0x0".

Figure 8:
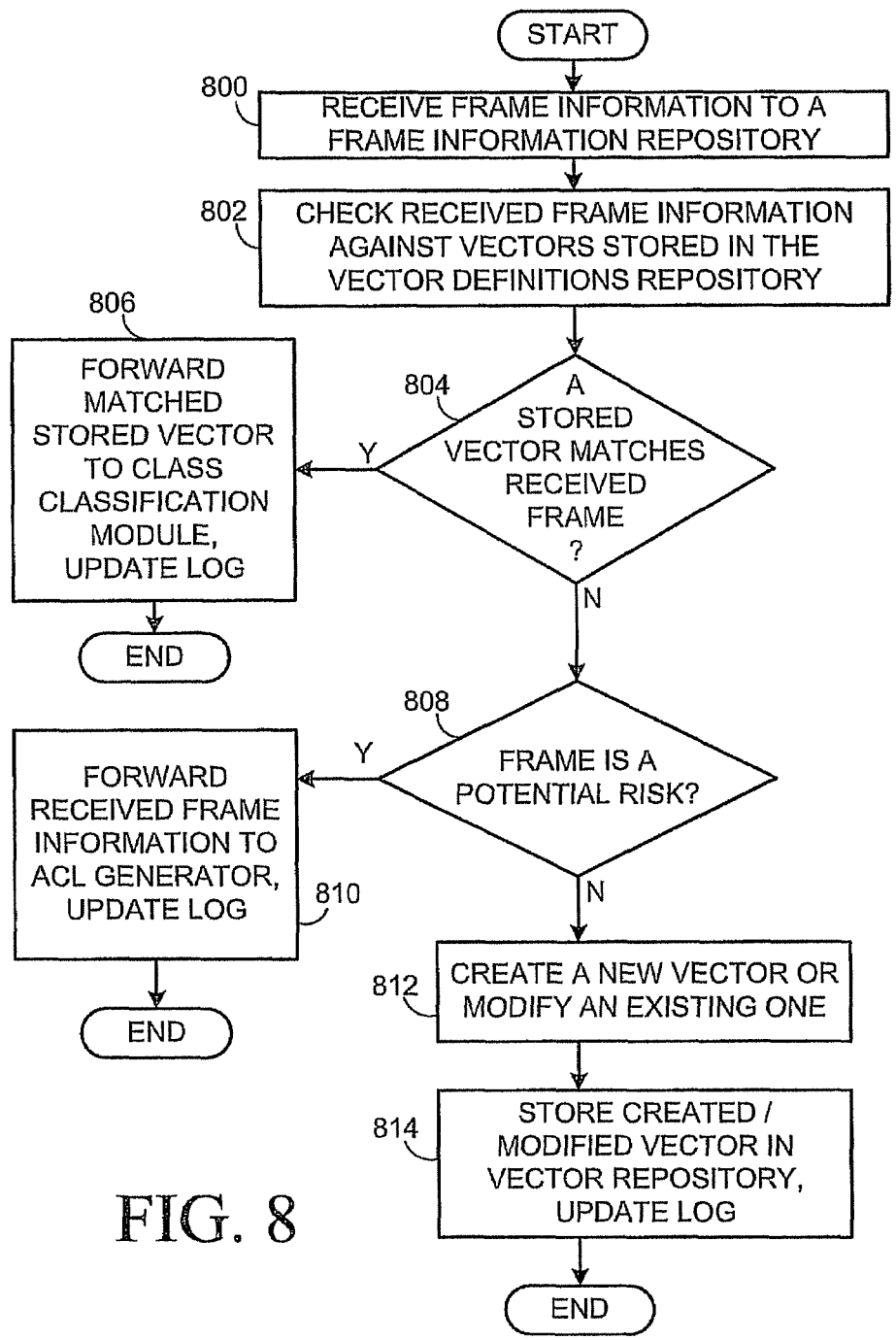
FIGS. 8-10 are flowcharts of exemplary methods in a network protection system, according to embodiments of the invention.

Reference is made now in addition to FIG. 8, which is a flowchart of an exemplary method in processing module 116, according to embodiments of the invention. At 800, processing module 116 receives frame information 614 from collector module 124 and stores frame information 614 in frame information repository 126. At 802, a vector classification module 130 of processing module 116 checks the received frame information 614 against vectors 622 that are stored in a vector definitions repository 128 of processing module 116. Vector definitions repository 128 may store definitions of vectors that are permitted in network 104.

At 804, vector classification module 130 finds that the received frame information 614 matches a vector 622 that is stored in vector definitions repository 128. In that case, at 806, vector classification module 130 forwards the matched vector 622 to a class classification module 132 of processing module 116, updates log 119, and the method terminates. Otherwise, vector classification module 130 forwards the received frame information to a vector evaluation module 134 of processing layer 116.

At 808, vector evaluation module 134 evaluates whether the received frame information 614 represents a potential risk to network 104 and/or to any of networks 106. If so, at 810, vector evaluation module 134 forwards the received frame information 614, and the reason that it is considered a potential risk, to ACL generator 118, updates log 119, and the method terminates.

Otherwise, vector evaluation module 134 forwards the received frame information 614 to a vector creation module 136 of processing module 116. At 812, vector creation module 136 creates a new vector from the received frame information 614, or modifies an existing stored vector according to the received frame information 614. In this manner, NPS 102 learns from the analysis of the received frame information 614. At 814, vector creation module 136 stores the created/modified vector in vector definitions repository 128, updates log 119, and the method terminates.

List 3 shows exemplary simplified vectors TCP80SYN, TCP80ACK, TCP80FACK, TCP80PSH, TCP80ACK2, TCP80PSH2, TCP80SACK, TCP80FACK2 that vector creation module 136 may generate from information of frames 7, 8, 9, 10, 11, 12, 13 and 15 of List 1:

List 3
  TCP80SYN=<10.10.1.100,10.10.1.151,1660,80,0x06
    (TCP), 0x04, 0x0002(SYN), protocol flags>
  TCP80ACK=<10.10.1.100,10.10.1.151,1660,80,0x06
    (TCP),0x0001(ACK), protocol flags>
  TCP80FACK=<10.10.1.100,10.10.1.151,1660,80,0x06
    (TCP),0x0011 (FINACK), protocol flags>
  TCP80PSH=<10.10.1.100,10.10.1.151,1660,80,0x06
    (TCP),0x0018(PSHACK), protocol flags>
  TCP80ACK2=<10.10.1. 151,10.10.1. 100,80,1660,0x06
    (TCP),0x0010(ACK), protocol flags>
  TCP80PSH2=<10.10.1.151,10.10.1.100,80,1660,0x06
    (TCP),0x0018(PSHACK), protocol flags>
  TCP80SACK=<10.10.1. 151,10.10.1. 100,80,1660,0x06
    (TCP),0x0012(SYNACK), protocol flags>
  TCP80FACK2=<10.10.1. 151,10.10.1. 100,80,1660,0x06
    (TCP),0x0011(FINACK), protocol flags>

Any particular class 624 is identified by a respective class identification tag 636, and defines a sequence of vectors and a set of constraints for the set of vectors. The sequence of vectors may represent a transaction according to the TCP protocol, the UDP protocol, the ICMP (Internet control message protocol) as defined in RFC 792 or any other relevant protocol. Examples for ICMP messages include an Echo reply (ICMP code 0), Echo (ICMP Code 8), Destination unreachable (ICMP Cod 3) and Traceroute RFC 1393 (ICMP Code 30). Class 624 includes identifications 627 of vectors that are part of the particular class and includes a relative time field 638, a relative occurrence list 640, a vector order list 642 and a data length field 644.

Vector order list 642 defines an authorized order of occurrence of the vectors in the sequence, and data length field 644 defines an authorized total amount of information to be transferred in the sequence. Relative time field 638 defines an authorized time gap between consecutive vectors in the sequence. Relative occurrence list 640 defines an authorized relative occurrence of each vector in the sequence, e.g. the amount of time any specific vector appears in the sequence. Any of fields 638 and 644 and lists 640 and 642 may optionally define an authorized deviation (tolerance) from the authorized value, or such deviation may optionally be defined in any other module of NPS 102.

Table 1 presents a definition of an exemplary class TCPHTTP1 including the vectors presented in List 3:

TABLE 1

| Field | Explanation | Value | Tolerance |
|---|---|---|---|
| Relative Time 638 | Time between consecutive packets | 0.93 s-1.5 s | +/−20% mean |
| Relative Occurrence 640 | Occurrence of the vector in the total | TCP80SYN <0.2% Total<br>TCP80ACK <50%<br>TCP80PSH2<br>TCP80FACK <0.2%<br>TCP80PSH <70% Total<br>TCP80ACK2 <50%<br>TCP80PSH<br>TCP80PSH2 <70% Total<br>TCP80SACK <0.2% Total<br>TCP80FACK2 <0.2% Total | +/−5% peak |
| Vectors Order 642 | Vector order of occurrence | TCP80SYN 1<br>TCP80ACK 3<br>TCP80FACK 4<br>TCP80PSH N/A<br>TCP80ACK2 N/A<br>TCP80PSH2 N/A<br>TCP80SACK 2<br>TCP80FACK2 9 | Yes for data<br>+/−20% for control<br>NO start session |
| Data length 644 | Amount of information transferred | 1 Gb-10 Gb Mean | 100% mean |

A class definitions repository 138 may store definitions of classes that are permitted in network 104, for example, the class TCPHTTP1.

Figure 9:
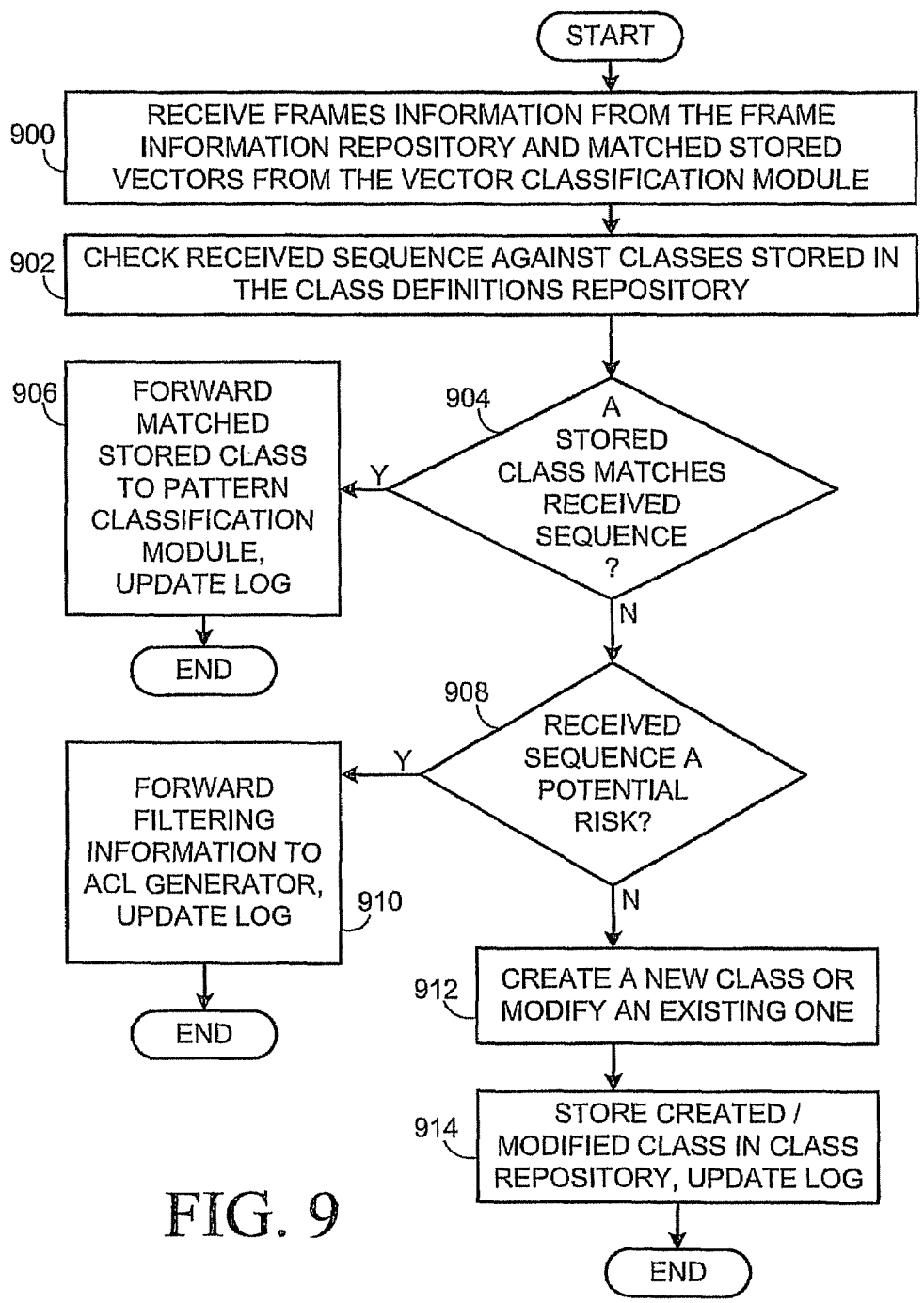

Reference is made now in addition to FIG. 9, which is a flowchart of an exemplary method in processing module 116, according to embodiments of the invention. At 900, class classification module 132 receives frame information 614 from frame repository 126 and receives respective matched vectors from vector classification module 130. At 902, class classification module 132 checks the information received from frame repository 126 and the vectors received from vector classification module 132 against classes that are stored in class definitions repository 138.

At 904, class classification module 132 checks whether the information received from frame repository 126 and the vectors received from vector classification module 132 match a class stored in class definitions repository 138. If so, at 906, class classification module 132 forwards the matched class to a pattern classification module 140, updates log 119, and the method terminates.

Table 2 presents an exemplary detected sequence of frames that is within the definitions and tolerances of TCPHTTP1.

The sequence presented in Table 2 may therefore cause the method of FIG. 9 to proceed from 904 to 906.

TABLE 2

| Vector Name | Relative time | Vector Order | Relative Occurrence | Data Length | |
|---|---|---|---|---|---|
| TCP80SYN | 0.024637999 | 1 | 0.18867925% | 62 | Bytes |
| TCP80ACK | 0.032434324 | 3 | 24.52830189% | <100 | Bytes |
| TCP80FACK | 0.039787877 | 4 | 0.18867925% | <100 | Bytes |
| TCP80PSH | 0.042897535 | 5 | 9.43396226% | <1514 | Bytes |
| TCP80ACK2 | 0.048434445 | 6 | 4.71698113% | <100 | Bytes |
| TCP80PSH2 | 0.056677754 | 7 | 60.56603774% | <1514 | Bytes |
| TCP80SACK | 0.058433244 | 8 | 0.18867925% | <100 | Bytes |
| TCP80FACK2 | 0.074632134 | 9 | 0.18867925% | <100 | Bytes |

If, at 904, class classification module 132 finds that the detected sequence is not within the definitions and tolerances of any class stored in class definitions repository 138, then class classification module 132 forwards the information received from frame repository 126 and the vectors received from vector classification module 132 to a class evaluation module 142 of processing module 116, and the method proceeds to 908.

The method may proceed from 904 to 908 if, for example, the received sequence does not match any definition of a class in class definitions repository 138, if the received sequence matches a definition of a class in class definitions repository 138 but is not within the tolerances of that class, if it includes too many or not enough vectors, if the relative time between vectors is not within the defined tolerance, if the relative occurrence of any of the vectors in the sequence is not within the defined tolerance, if the order of vectors does not match any of the classes, or if the amount of information included in the sequence is not within the defined tolerance.

At 908, class evaluation module 142 determines whether the information received from frame repository 126 and the vectors received from vector classification module 132 represent a potential risk to network 104 and/or to any of networks 106. If so, at 910, class evaluation module 142 forwards the source, destination and protocol of the threatening traffic to ACL generator 118, updates log 119, and the method terminates.

Otherwise, class evaluation module 142 forwards the information received from frame repository 126 and the vectors received from vector classification module 132 to a class creation module 144 of processing module 116. At 912, class creation module 144 creates a new class from the received frame information and the respective matched vectors, or modifies an existing stored class according to the received frame information and the respective matched vector. In this manner, NPS 102 learns from the analysis of the network traffic. At 914, class creation module 144 stores the created/modified class in class definitions repository 138, updates log 119, and the method terminates.

Line (3) presents an example of a sequence that may trigger class evaluation module 142 to alert ACL generator 118:

(3) TCPSYN=<10.10.1.100,10.10.1.151,1704,339,0x06 (TCP), 0x04, 0x0002(SYN), protocol Flags>

The sequence presented in Line (3) is a one-vector sequence and the vector is identified as legal at vector classification module 130. However, if no class in class definitions repository 138 permits port 339 to be a destination for a TCP SYN frame, class evaluation module 142 may alert ACL generator 118.

List 4 presents another example of a sequence that may trigger class evaluation module 142 to alert ACL generator 118:

List 4
TCPSYN=<10.10.1.100,10.10.1.151,1664,80,0x06 (TCP),0x04, 0x0002(SYN), protocol Flags>
TCPSYN=<10.10.1.100,10.10.1.151,1665,80,0x06 (TCP),0x04, 0x0002(SYN), protocol Flags>
TCPSYN=<10.10.1.100,10.10.1.151,1667,80,0x06 (TCP),0x04, 0x0002(SYN), protocol Flags>
TCPSYN=<10.10.1.100,10.10.1.151,1668,80,0x06 (TCP),0x04, 0x0002(SYN), protocol Flags>
TCPSYN=<10.10.1.100,10.10.1.151,1669,80,0x06 (TCP),0x04, 0x0002(SYN), protocol Flags>
TCPSYN=<10.10.1.100,10.10.1.151,1670,80,0x06 (TCP),0x04, 0x0002(SYN), protocol Flags>
TCPSYN=<10.10.1.100,10.10.1.151,1671,80,0x06 (TCP),0x04, 0x0002(SYN), protocol Flags>
TCPSYN=<10.10.1.100,10.10.1.151,1672,80,0x06 (TCP),0x04, 0x0002(SYN), protocol Flags>

The sequence presented in List 4 contains eight vectors that may be separately identified as legal at vector classification module 130. The sequence of List 4 can be generated as part of an attack on network 104, scanning for a port on a node 108 having an IP address 10.10.1.151. If no class in class definitions repository 138 permits the sequence of List 4, class evaluation module 142 may alert ACL generator 118.

Any particular pattern 626 is identified by a respective pattern identification tag 646. A pattern includes a list 648 of identification tags of classes that are not authorized to be included in the pattern, and a list 650 of identification tags of classes that are authorized to be included in the pattern. For each class that is identified as authorized in list 650, pattern 626 includes a field 652 defining an authorized relative occurrence of the class in the pattern, and a field 654 defining authorized times and/or dates for the occurrence of the class in the pattern. Pattern 626 includes a field 656 defining any restrictions on the order of occurrence of the authorized classes in the pattern. Any of fields 652, 654 and 656 may optionally define an authorized deviation (tolerance) from the authorized values, or such deviation may optionally be defined in any other module of NPS 102.

Patterns 626 link between communication events in network 104 and objects 658. Objects 658 are entities that are related to network 104, for example, any users of network 104 or any of nodes 108. Objects 658 may be represented in system 100 by respective object identification tags 660. Any one of patterns 626 includes a list 662 of identifications of objects 658 that are authorized to use the pattern, and/or a list 664 of identification tags of objects 658 that are not authorized to use the pattern. Any of patterns 626 may include a control field 666 defining criteria for authorizing objects 658 to use the pattern.

Table 3 presents a definition of an exemplary pattern TCP-DATA1 that includes the class TCPHTTP1 and a class TCPSSH1:

TABLE 3

| Field | Value | Tolerance | Description |
|---|---|---|---|
| Authorized Objects 662 | 10.10.1.100 to 10.10.1.150 | Yes | User or group of users |
| Authorized classes 650 | TCPHTTP1 TCPSSH1 TCPFTP1 | N/A | Name of classes |
| Unauthorized classes 648 | TCPTELNET | NO | Name of classes |
| Occurrence | TCPHTTP1 no limit | +/−25% | Occurrence of classes. |

TABLE 3-continued

| Field | Value | Tolerance | Description |
|---|---|---|---|
| fields 652 | TCPSSH1 no limit TCPFTP1 20% of total | | How many times each class appear in a period of time |
| Order of occurrence 656 | No restriction | No restriction | List of occurrence order if apply for the pattern |
| Date, time field 654 | TCPHTTP1 7x24 TCPSSH1 7x24 TCPFTP1 8x5 | +/−20% mean | Date, time of occurrence of class |
| Control field 666 | TCPMAIL TCP8080 TCP1080 | NO | This field describes the acceptance of new classes in the list of this pattern for the attached objects |

Table 4 defines class TCPSSH1:

TABLE 4

| Information | Explanation | Value | Tolerance |
|---|---|---|---|
| Relative Time 638 | Is the time between each packet | 0.20 s-0.70 s | +/−10% mean |
| Relative occurrence 640 | Occurrence of the vector in the total | TCP22SYN <0.01% total<br>TCP22ACK <50% total<br>TCP22FACK <0.01% total<br>TCP22PSH <90%<br>TCP22PACK <20% TCP22PSH<br>TCP22SACK <50% total<br>TCP22PSH2 <90% Total<br>TCP22FACK2 <0.01% total | +/−5% peak |
| Vectors Order 642 | Vector order of occurrence | TCP22SYN 1<br>TCP22ACK N/A<br>TCP22FACK 8<br>TCP22PSH N/A<br>TCP22PACK N/A<br>TCP22SACK 2<br>TCP22PSH2 N/A<br>TCP22FACK2 7 | Yes for data<br>+/−10% for control<br>NO start session |
| Data length 644 | Amount of information transferred | 10 Gb-15 Gb Mean | 100% mean |

List 5 presents vectors TCP22SYN, TCP22ACK, TCP22FACK, TCP22PSH, TCP22PACK, TCP22SACK, TCP22PSH2 and TCP22FACK2 that appear in class TCPSSH1:

List 5

TCPSYN=<10.10.1.100,10.10.1.151,1664,22,0x06 (TCP),0x04, 0x0002(SYN), protocol Flags>
TCPACK=<10.10.1.100,10.10.1.151,1664,22,0x06 (TCP),0x0010(ACK), protocol flags>
TCPFACK=<10.10.1.100,10.10.1.151,1664,22,0x06 (TCP),0x0011(FINACK), protocol flags>
TCPSH=<10.10.1.100,10.10.1.151,1664,22,0x06(TCP), 0x0018(PSHACK), protocol flags>
TCPACK=<10.10. 1. 151,10.10.1. 100,22,1664,0x06 (TCP),0x0010(ACK), protocol flags>
TCP SACK=<10.10.1. 151,10.10.1. 100,22,1664,0x06 (TCP),0x0012(SYNACK), protocol flags>
TCPSH2=<10.10.1.151,10.10.1.100,22,1664,0x06(TCP), 0x0018(PSHACK), protocol flags>
TCPFACK2=<10.10.1. 151,10.10.1. 100,22,1664,0x06 (TCP),0x0011(FINACK), protocol flags>

A pattern definitions repository 146 may store definitions of patterns that are permitted in network 104, for example, the pattern TCPDATA1.

Figure 10:
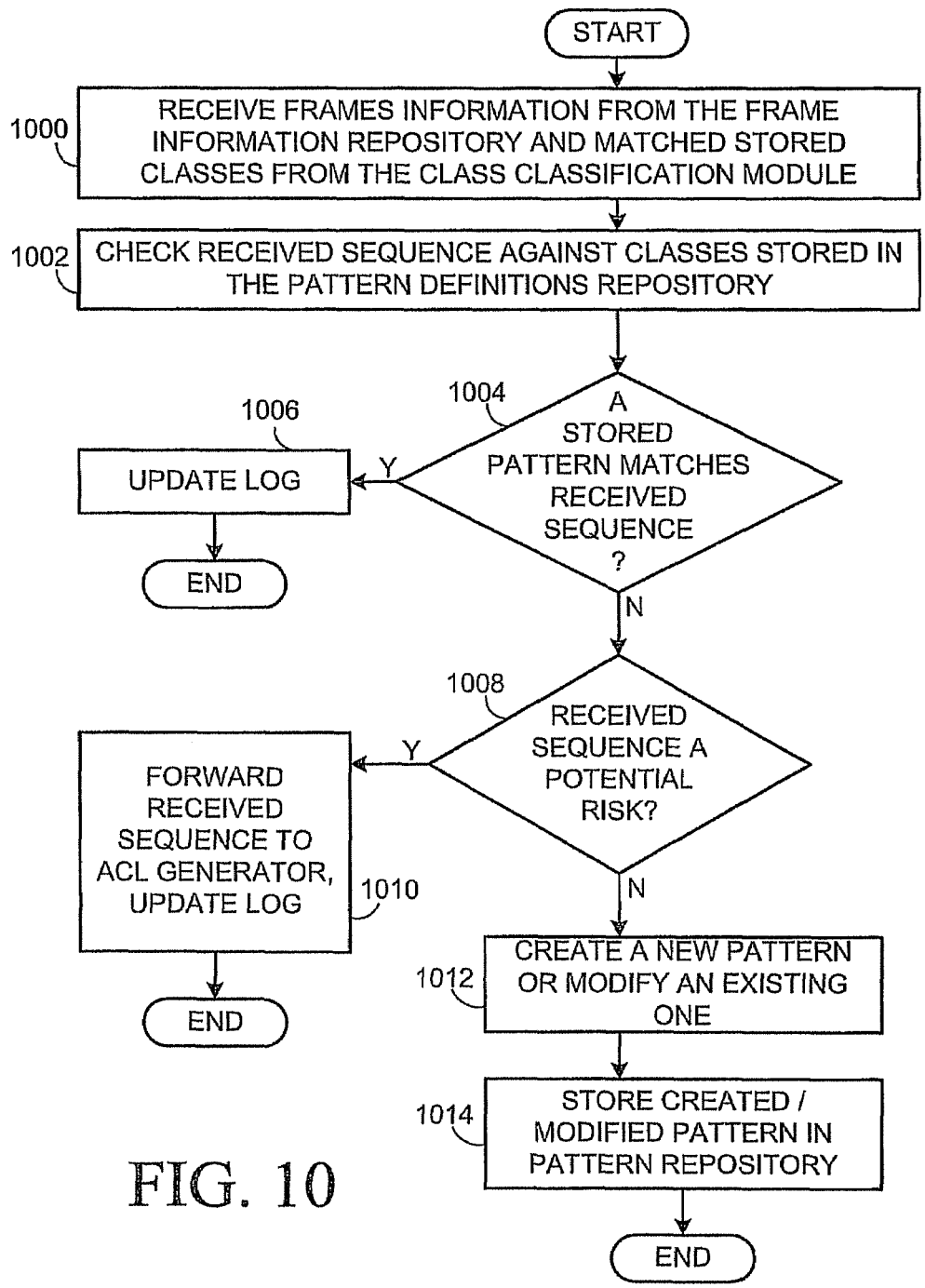

Reference is made now in addition to FIG. 10, which is a flowchart of an exemplary method in processing module 116, according to embodiments of the invention. At 1000, pattern classification module 140 receives frames information 614 from frame repository 126 and receives respective matched classes from class classification module 132. At 1002, pattern classification module 140 checks the information received from frame repository 126 and the classes received from vector classification module 132 against patterns that are stored in pattern definitions repository 146.

At 1004, pattern classification module 140 checks whether the information received from frame repository 126 and the classes received from class classification module 132 matches a pattern stored in pattern definitions repository 146. If so, pattern classification module 140 updates log 119 at 1006, and the method terminates.

Table 5 presents an exemplary sequence that includes classes TCPHTTP1 and a class TCPSSH1 and is within the tolerances and definitions of pattern TCPDATA1. The sequence presented in Table 5 may cause the method of FIG. 10 to proceed from 1004 to 1006.

TABLE 5

| Class Name | TCPHTTP1 | TCPSSH1 |
|---|---|---|
| Objects | 10.10.1.100<br>10.10.1.150 | 10.10.1.100<br>10.10.1.150 |
| No class | N/A | N/A |
| Date | Mon(15:00-15:07) | Mon(14:57-15:06) |
| Control | N/A | N/A |
| Occurrence | 73% total | 27% total |
| Order | 1Alternate | Alternate |

If, at 1004, pattern classification module 140 finds that the information received from frame repository 126 and the classes received from class classification module 132 do not match a pattern stored in pattern definitions repository 146, pattern classification module 140 forwards the information received from frame repository 126 and the classes received from class classification module 132 to a pattern evaluation module 148 of processing module 116, and the method proceeds to 1008.

In the example of pattern TCPDATA1 and the sequence presented in Table 5, the method may proceed from 1004 to 1008 if, for example, the sequence is performed by an unauthorized object 608, if an unauthorized class was included as part of the sequence, if occurrence of an authorized class in the pattern is not within the defined tolerances, if the order of occurrence of classes in the pattern is not as defined in the pattern or if the sequence was detected at an unauthorized time.

For example, Table 6 shows a sequence similar to pattern TCPDATA1. However, class TCPHTTP1 is performed by unauthorized objects (IP addresses 10.10.1.25) and therefore the sequence may cause the method of FIG. 10 to proceed from 1004 to 1008.

TABLE 6

| Class Name | TCPHTTP1 | TCPSSH1 |
|---|---|---|
| Objects | 10.10.1.25 | 10.10.1.100 |
|  | 10.10.1.150 | 10.10.1.150 |
| No class | N/A | N/A |
| Date | Mon(15:00-15:07) | Mon(14:57-15:06) |
| Control | N/A | N/A |
| Occurrence | 73% total | 27% total |
| Order | 1Alternate | Alternate |

In another example, Table 7 shows a detected sequence that includes classes TCPHTTP1 and TCPSSH1 in a manner that is acceptable for pattern TCPDATA1. However, the sequence also includes a class TCP6006 that is not authorized in pattern TCPDATA1 and therefore the sequence may cause the method of FIG. 10 to proceed from 1004 to 1008

TABLE 7

| Class Name | TCPHTTP1 | TCPSSH1 | TCP6006 |
|---|---|---|---|
| Objects | 10.10.1.100 | 10.10.1.100 | 10.10.1.111 |
|  | 10.10.1.150 | 10.10.1.150 | 10.10.1.192 |
| No class | N/A | N/A | N/A |
| Date | Mon | Mon | Mon |
|  | (15:00-15:07) | (14:57-15:06) | (14:47-15:23) |
| Control | N/A | N/A | N/A |
| Occurrence | 63% total | 17% total | 20% Total |
| Order | Alternate | Alternate | Alternate |

At 1008, pattern evaluation module 148 determines whether the information received from frame repository 126 and the classes received from class classification module 132 represent a potential risk to network 104 and/or to any of networks 106. If so, at 1010, pattern evaluation forwards the source, destination and protocol of the threatening traffic to ACL generator 118, updates log 119, and the method terminates.

Otherwise, pattern evaluation module148 forwards the information received from frame repository 126 and the classes received from class classification module 132 to a pattern creation module 150 of processing module 116. At 1012, pattern creation module 150 creates a new pattern from the information received from frame repository 126 and the classes received from class classification module 132, or modifies an existing stored pattern according to the information received from frame repository 126 and the classes received from class classification module 132. In this manner, NPS 102 learns from the analysis of the network traffic. At 1014, pattern creation module 150 stores the created/modified pattern in pattern definitions repository 146, updates log 119, and the method terminates.

Patterns 626 may be generated automatically by NPS 102 or may be entered by a system administrator via administration I/F 123. Patterns may represent behaviors of users and/or nodes of the network. For example, a pattern TCPHHTP0 may relate to all computers 175 of VLAN 174 (accounting department) that are using HTTP destination port 80 during work hours. In another example a pattern TCPHHTP1 may relate to all computers 183 of VLAN 182 (help desk department) that are accessing servers 184 between 9:00 AM and 11:00 AM. New patterns detected in the network are compared to the knowledge of regular behaviors in the network, and deviations from normal behavior will be questioned. For example, attempt to access servers 176 of the accounting department from one of computers 183 of the help desk department will be flagged by pattern evaluation module 148 as a deviation from normal behavior.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for processing frames transmitted in a network comprising a plurality of nodes and a plurality of network segments, each network segment connecting at least two nodes of the plurality of nodes, said method comprising:
   detecting a frame transmitted over one or more network segments of the plurality of network segments;
   extracting frame information from the detected frame
   determining whether the extracted frame information matches frame information specified in any vector of multiple vectors stored in a vector definitions repository, which results in determining that the extracted frame information does not match frame information specified in any vector of the multiple vectors stored in the vector definitions repository, wherein each vector of the multiple vectors stored in the vector definitions repository specifies frame information defining one or more frames permitted in the network;
   responsive to said determining that the extracted frame information does not match frame information specified in any vector of the multiple vectors stored in the vector definitions repository, determining whether the extracted frame information represents a risk to the network, which results in determining that the extracted frame information does not represents a risk to the network;
   in response to said determining that the extracted frame information does not represents a risk to the network, either creating a new vector from the retrieved frame information and storing the new vector in the vector definitions repository or modifying a vector that is stored in the vector definitions repository according to the retrieved frame information, wherein the new or modified vector stored in the vector definitions repository further defines frames permitted in the network.

2. A method for processing frames transmitted in a network comprising a plurality of nodes and a plurality of network segments, each network segment connecting at least two nodes of the plurality of nodes, said method comprising:
   retrieving, from a frame information repository, frame information previously extracted from each frame of a sequence of frames;
   determining that the retrieved frame information of each frame in the sequence of frames matches frame information specified in a respective vector of multiple vectors stored in a vector definitions repository, wherein each vector of the multiple vectors stored in the vector definitions repository specifies frame information defining one or more frames permitted in the network;

receiving the respective matched vectors from the vector definitions repository, said matched vectors being a sequence of vectors sequenced in a same order as the respective frames in the sequence of frames are ordered, wherein a class definitions repository stores classes permitted in the network, and wherein each class stored in the class definitions repository comprises a plurality of constraints on vectors specified for each class;

determining whether the sequence of vectors satisfies the plurality of constraints on the vectors specified for any class stored in the class definitions repository, which results in determining that the sequence of vectors does not satisfy the plurality of constraints on the vectors specified for any class stored in the class definitions repository;

responsive to said determining that the sequence of vectors does not satisfy the plurality of constraints on the vectors specified for any class stored in the class definitions repository, determining whether the retrieved frame information and the sequence of vectors represent a risk to the network, which results in determining that the retrieved frame information and the sequence of vectors do not represent a risk to the network;

in response to said determining that the retrieved frame information and the sequence of vectors do not represent a risk to the network, either creating a new class from the retrieved frame information and the sequence of vectors and storing the new class in the class definitions repository or modifying a class that is stored in the class definitions repository according to the retrieved frame information and the sequence of vectors, wherein the new or modified class stored in the class definitions repository adds to the classes permitted in the network.

3. The method of claim 2, wherein the plurality of constraints on vectors specified for each class comprises a specified order of occurrence of the vectors of each class, and wherein the sequence of vectors not satisfying the plurality of constraints comprises the same order in which the matched vectors are sequenced differing from the specified order of occurrence of the vectors of each class.

4. The method of claim 2, wherein the plurality of constraints on vectors specified for each class comprises a specified relative time duration of occurrence of the vectors of each class, and wherein the sequence of vectors not satisfying the plurality of constraints comprises the sequence of vectors not satisfying the specified relative time duration of occurrence of the vectors of each class.

5. The method of claim 2, wherein the plurality of constraints on vectors specified for each class comprises consecutive vectors of each class being separated in time by a specified range of time gap, and wherein the sequence of vectors not satisfying the plurality of constraints comprises consecutive vectors in the sequence of vectors not being separated in time by a time gap within the specified range of time gap.

6. The method of claim 2, wherein the plurality of constraints on vectors specified for each class comprises a specified range of data length for the total data collectively encompassed by the vectors of each class, and wherein the sequence of vectors not satisfying the plurality of constraints comprises the total data collectively encompassed by the vectors of the sequence of vectors not being within the specified range of data length.

7. A method for processing frames transmitted in a network comprising a plurality of nodes and a plurality of network segments, each network segment connecting at least two nodes of the plurality of nodes, said method comprising:

retrieving, from a frame information repository, frame information previously extracted from each frame of a sequence of frames;

determining that the retrieved frame information of each frame in the sequence of frames matches frame information specified in a respective vector of multiple vectors stored in a vector definitions repository, wherein each vector of the multiple vectors stored in the vector definitions repository specifies frame information defining one or more frames permitted in the network;

receiving the respective matched vectors from the vector definitions repository, said matched vectors being a sequence of vectors sequenced in a same order as the respective frames in the sequence of frames are ordered, wherein a class definitions repository stores classes permitted in the network, and wherein each class stored in the class definitions repository comprises a plurality of constraints on vectors specified for each class;

determining that the sequence of vectors satisfies the plurality of constraints on the vectors specified for one class stored in the class definitions repository;

responsive to said determining that the sequence of vectors satisfies the plurality of constraints on the vectors specified for the one class stored in the class definitions repository, receiving a plurality of classes from the class definitions repository;

after said receiving the plurality of classes, determining whether the received plurality of classes satisfies a plurality of constraints on classes specified for any pattern stored in a pattern definitions repository, which results in determining that the received plurality of classes does not satisfy the plurality of constraints on classes specified for any pattern stored in the pattern definitions repository, wherein each pattern of multiple patterns stored in the pattern definitions repository comprises a plurality of constraints on classes specified for each pattern, and wherein the patterns stored in the patterns definitions repository are patterns permitted in the network;

responsive to said determining that the received plurality of classes does not satisfy the plurality of constraints on classes specified for any pattern stored in the pattern definitions repository, determining whether the retrieved frame information and the received plurality of classes represent a risk to the network, which results in determining that the retrieved frame information and the received plurality of classes do not represent a risk to the network;

in response to said determining that the retrieved frame information and the received plurality of classes do not represent a risk to the network, either creating a new pattern from the retrieved frame information and the received plurality of classes and storing the new pattern in the pattern definitions repository or modifying a pattern that is stored in the pattern definitions repository according to the retrieved frame information and the received plurality of classes, wherein the new or modified pattern stored in the patterns definitions repository adds to the patterns permitted in the network.

8. The method of claim 7, wherein the plurality of constraints on classes specified for each pattern comprises a specified order of occurrence of the classes of each pattern, and wherein the received plurality of classes not satisfying the plurality of constraints comprises the classes of the received plurality of classes being sequenced in a different order from the specified order of occurrence of the classes of each pattern.

9. The method of claim 7, wherein the plurality of constraints on classes specified for each pattern comprises specified dates and times of occurrence of the classes of each pattern, and wherein the received plurality of classes not satisfying the plurality of constraints comprises the received plurality of classes not satisfying the specified dates and times of occurrence.

10. The method of claim 7, wherein the plurality of constraints on classes specified for each pattern comprises a specified relative time duration of occurrence of the classes of each pattern, and wherein the received plurality of classes not satisfying the plurality of constraints comprises the received plurality of classes not satisfying the specified relative time duration of occurrence of the classes of each pattern.

11. The method of claim 7, wherein the plurality of constraints on classes specified for each pattern comprises a list of classes not authorized to be included in the pattern, and wherein the received plurality of classes not satisfying the plurality of constraints comprises the received plurality of classes comprising a class included in the list classes not authorized to be included in the pattern.

12. A computer system comprising a processor and a computer readable hardware storage medium coupled to the processor, said storage medium containing software that when executed by the processor implement a method for processing frames transmitted in a network comprising a plurality of nodes and a plurality of network segments, each network segment connecting at least two nodes of the plurality of nodes, said method comprising:
retrieving, from a frame information repository, frame information previously extracted from each frame of a sequence of frames;
determining that the retrieved frame information of each frame in the sequence of frames matches frame information specified in a respective vector of multiple vectors stored in a vector definitions repository, wherein each vector of the multiple vectors stored in the vector definitions repository specifies frame information defining one or more frames permitted in the network;
receiving the respective matched vectors from the vector definitions repository, said matched vectors being a sequence of vectors sequenced in a same order as the respective frames in the sequence of frames are ordered, wherein a class definitions repository stores classes permitted in the network, and wherein each class stored in the class definitions repository comprises a plurality of constraints on vectors specified for each class;
determining whether the sequence of vectors satisfies the plurality of constraints on the vectors specified for any class stored in the class definitions repository, which results in determining that the sequence of vectors does not satisfy the plurality of constraints on the vectors specified for any class stored in the class definitions repository;
responsive to said determining that the sequence of vectors does not satisfy the plurality of constraints on the vectors specified for any class stored in the class definitions repository, determining whether the retrieved frame information and the sequence of vectors represent a risk to the network, which results in determining that the retrieved frame information and the sequence of vectors do not represent a risk to the network;
in response to said determining that the retrieved frame information and the sequence of vectors do not represent a risk to the network, either creating a new class from the retrieved frame information and the sequence of vectors and storing the new class in the class definitions repository or modifying a class that is stored in the class definitions repository according to the retrieved frame information and the sequence of vectors, wherein the new or modified class stored in the class definitions repository adds to the classes permitted in the network.

13. The computer system of claim 12, wherein the plurality of constraints on vectors specified for each class comprises a specified order of occurrence of the vectors of each class, and wherein the sequence of vectors not satisfying the plurality of constraints comprises the same order in which the matched vectors are sequenced differing from the specified order of occurrence of the vectors of each class.

14. The computer system of claim 12, wherein the plurality of constraints on vectors specified for each class comprises a specified relative time duration of occurrence of the vectors of each class, and wherein the sequence of vectors not satisfying the plurality of constraints comprises the sequence of vectors not satisfying the specified relative time duration of occurrence of the vectors of each class.

15. The computer system of claim 12, wherein the plurality of constraints on vectors specified for each class comprises consecutive vectors of each class being separated in time by a specified range of time gap, and wherein the sequence of vectors not satisfying the plurality of constraints comprises consecutive vectors in the sequence of vectors not being separated in time by a time gap within the specified range of time gap.

16. The computer system of claim 12, wherein the plurality of constraints on vectors specified for each class comprises a specified range of data length for the total data collectively encompassed by the vectors of each class, and wherein the sequence of vectors not satisfying the plurality of constraints comprises the total data collectively encompassed by the vectors of the sequence of vectors not being within the specified range of data length.

17. A computer system comprising a processor and a computer readable hardware storage medium coupled to the processor, said storage medium containing software that when executed by the processor implement a method for processing frames transmitted in a network comprising a plurality of nodes and a plurality of network segments, each network segment connecting at least two nodes of the plurality of nodes, said method comprising:
retrieving, from a frame information repository, frame information previously extracted from each frame of a sequence of frames;
determining that the retrieved frame information of each frame in the sequence of frames matches frame information specified in a respective vector of multiple vectors stored in a vector definitions repository, wherein each vector of the multiple vectors stored in the vector definitions repository specifies frame information defining one or more frames permitted in the network;
receiving the respective matched vectors from the vector definitions repository, said matched vectors being a sequence of vectors sequenced in a same order as the respective frames in the sequence of frames are ordered, wherein a class definitions repository stores classes permitted in the network, and wherein each class stored in the class definitions repository comprises a plurality of constraints on vectors specified for each class;
determining that the sequence of vectors satisfies the plurality of constraints on the vectors specified for one class stored in the class definitions repository;

responsive to said determining that the sequence of vectors satisfies the plurality of constraints on the vectors specified for the one class stored in the class definitions repository, receiving a plurality of classes from the class definitions repository;

after said receiving the plurality of classes, determining whether the received plurality of classes satisfies a plurality of constraints on classes specified for any pattern stored in a pattern definitions repository, which results in determining that the received plurality of classes does not satisfy the plurality of constraints on classes specified for any pattern stored in the pattern definitions repository, wherein each pattern of multiple patterns stored in the pattern definitions repository comprises a plurality of constraints on classes specified for each pattern, and wherein the patterns stored in the patterns definitions repository are patterns permitted in the network;

responsive to said determining that the received plurality of classes does not satisfy the plurality of constraints on classes specified for any pattern stored in the pattern definitions repository, determining whether the retrieved frame information and the received plurality of classes represent a risk to the network, which results in determining that the retrieved frame information and the received plurality of classes do not represent a risk to the network;

in response to said determining that the retrieved frame information and the received plurality of classes do not represent a risk to the network, either creating a new pattern from the retrieved frame information and the received plurality of classes and storing the new pattern in the pattern definitions repository or modifying a pattern that is stored in the pattern definitions repository according to the retrieved frame information and the received plurality of classes, wherein the new or modified pattern stored in the patterns definitions repository adds to the patterns permitted in the network.

18. The computer system of claim 17, wherein the plurality of constraints on classes specified for each pattern comprises a specified order of occurrence of the classes of each pattern, and wherein the received plurality of classes not satisfying the plurality of constraints comprises the classes of the received plurality of classes being sequenced in a different order from the specified order of occurrence of the classes of each pattern.

19. The computer system of claim 17, wherein the plurality of constraints on classes specified for each pattern comprises specified dates and times of occurrence of the classes of each pattern, and wherein the received plurality of classes not satisfying the plurality of constraints comprises the received plurality of classes not satisfying the specified dates and times of occurrence.

20. The computer system of claim 17, wherein the plurality of constraints on classes specified for each pattern comprises a specified relative time duration of occurrence of the classes of each pattern, and wherein the received plurality of classes not satisfying the plurality of constraints comprises the received plurality of classes not satisfying the specified relative time duration of occurrence of the classes of each pattern.

21. The computer system of claim 17, wherein the plurality of constraints on classes specified for each pattern comprises a list of classes not authorized to be included in the pattern, and wherein the received plurality of classes not satisfying the plurality of constraints comprises the received plurality of classes comprising a class included in the list classes not authorized to be included in the pattern.

* * * * *